United States Patent
Johansson et al.

(10) Patent No.: US 10,750,469 B2
(45) Date of Patent: Aug. 18, 2020

(54) POSITIONING PROCEDURE FOR RELAXED MOBILITY IOT DEVICES

(71) Applicant: Telefonaktiebolaget LM Ericsson (publ), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/346,921

(22) PCT Filed: Oct. 31, 2017

(86) PCT No.: PCT/SE2017/051066
§ 371 (c)(1),
(2) Date: May 2, 2019

(87) PCT Pub. No.: WO2018/084778
PCT Pub. Date: May 11, 2018

(65) Prior Publication Data
US 2020/0059885 A1    Feb. 20, 2020

Related U.S. Application Data

(60) Provisional application No. 62/416,840, filed on Nov. 3, 2016.

(51) Int. Cl.
| H04W 64/00 | (2009.01) |
| H04W 36/08 | (2009.01) |
| H04W 36/38 | (2009.01) |
| G01S 5/14 | (2006.01) |

(52) U.S. Cl.
CPC ........... *H04W 64/00* (2013.01); *H04W 36/08* (2013.01); *H04W 36/385* (2013.01); *G01S 5/14* (2013.01)

(58) Field of Classification Search
CPC ... H04W 64/00; H04W 36/08; H04W 36/385; H04W 48/20; H04W 64/003; G01S 5/02; G01S 5/14
See application file for complete search history.

(56) References Cited

U.S. PATENT DOCUMENTS

| 8,718,675 B1 * | 5/2014 | Choi | .................... H04W 68/02 455/456.1 |
| 2014/0370915 A1 | 12/2014 | Jung et al. | |

(Continued)

FOREIGN PATENT DOCUMENTS

| EP | 2987374 A1 | 2/2016 | |
| GB | 2513181 A * | 10/2014 | ............ H04W 76/10 |

(Continued)

OTHER PUBLICATIONS

3GPP, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (", 3GPP TS 44.060 V13.2.0, Jun. 2016, 1-744.

(Continued)

*Primary Examiner* — Magdi Elhag
(74) *Attorney, Agent, or Firm* — Murphy, Bilak & Homiller, PLLC

(57) ABSTRACT

Method performed by a first network node (101), e.g. a SGSN or an MME. The first network node (101) initiates sending (401) a first paging request to a second network node (102), e.g. a node of a Base Station Subsystem (BSS), which indicates that a wireless device (141) served by the second network node (102) is to initiate cell reselection prior to sending a first response, based on the first paging request, (Continued)

wherein the wireless device (141) is to be paged for a positioning procedure, e.g. a timing advance (TA) multilateration.

21 Claims, 9 Drawing Sheets

(56) References Cited

U.S. PATENT DOCUMENTS

| | | | |
|---|---|---|---|
| 2018/0192387 A1* | 7/2018 | Jung | H04W 56/0045 |
| 2018/0217225 A1* | 8/2018 | Diachina | G01S 5/06 |
| 2019/0174456 A1* | 6/2019 | Johansson | H04W 64/003 |

FOREIGN PATENT DOCUMENTS

| | | |
|---|---|---|
| RU | 2014101630 A | 7/2015 |
| WO | 2014170632 A1 | 10/2014 |

OTHER PUBLICATIONS

3GPP, "3rd Generation Partnership Project; Technical Specification Group GSM/EDGE Radio Access Network; General Packet Radio Service (GPRS); Overall description of the GPRS radio interface; Stage 2 (Release 13)", 3GPP TS 43.064 V13.2.0, May 2016, 1-117.

3GPP, "3rd Generation Partnership Project; Technical Specification Group GSM/EDGE Radio Access Network; Location Services (LCS); Base Station System Application Part LCS Extension (BSSAP-LE) (Release 13)", 3GPP TS 49.031 V13.0.0, Jan. 2016, 1-52.

3GPP, "3rd Generation Partnership Project; Technical Specification Group Radio Access Network; Functional stage 2 description of Location Services (LCS) in GERAN (Release 14)", 3GPP TS 43.059 V14.2.0, Sep. 2017, 1-83.

3GPP, "3rd Generation Partnership Project; Technical Specification Group Radio Access Network; Mobile radio interface layer 3 specification; GSM/EDGE Radio Resource Control (RRC) protocol (Release 13)", 3GPP TS 44.018 V13.3.0, Sep. 2016, 1-534.

* cited by examiner

POSITIONING PROCEDURE FOR RELAXED MOBILITY IOT DEVICES

TECHNICAL FIELD

The present disclosure relates generally to a first network node and methods performed thereby for handling a positioning procedure. The present disclosure also relates generally to a second network node and methods performed thereby for handling a positioning procedure. The present disclosure additionally relates generally to a wireless device and methods performed thereby for handling a positioning procedure. The present disclosure further relates to computer program products, comprising instructions to carry out the actions described herein, as performed by the first network node, the second network node and the wireless device. The computer program products may be stored on computer-readable storage mediums.

BACKGROUND

In a typical wireless communication network, wireless devices, also known as wireless communication devices, Mobile Stations (MS), stations (STA) and/or user equipments (UE), communicate via a Radio Access Network (RAN) with one or more core networks (CN). The RAN covers a geographical area which is divided into service areas or cell areas, which may also be referred to as a beam or a beam group, with each service area or cell area being served by a radio network node such as a radio access node e.g., a Radio Base Station (RBS), which sometimes may be referred to as e.g., BTS (Base Transceiver Station), evolved Node B ("eNB"), "eNodeB", "NodeB", or "B node", depending on the technology and terminology used. A service area or cell area is a geographical area where radio coverage is provided by the radio network node. The radio network node communicates over an air interface operating on radio frequencies with the wireless device within range of the radio network node.

The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

A Universal Mobile Telecommunications System (UMTS) is a third generation (3G) telecommunication network, which evolved from the second generation (2G) Global System for Mobile telephony (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Positioning

At RAN#72, a Work item on "Positioning Enhancements for GERAN" was approved, see RP-161260, "New Work Item on Positioning Enhancements for GERAN", source Ericsson LM, Orange, MediaTek Inc., Sierra Wireless, Nokia, wherein one candidate method for realizing improved accuracy when determining the position of a mobile station (MS) is Timing Advance (TA) multilateration, see also RP-161034, "Positioning Enhancements for GERAN—introducing TA trilateration", source Ericsson LM. RAN#72. TA multilateration may be understood as relying on establishing the MS position based on TA values in multiple cells.

At RAN1#86, a proposal based on a similar approach was made also to support positioning of Narrow Band-Internet of Things (NB-IoT) mobiles.

TA may be understood as a measure of the propagation delay between a BTS and the MS. Since the speed by which radio waves travel is known, the distance between the BTS and the MS may be derived. Further, if the TA applicable to a MS is measured within multiple BTSs, and the positions of these BTSs are known, the position of the MS may be derived using the measured TA values. Measurement of TA may require that the MS synchronizes to each neighbor BTS and transmits a signal time-aligned with the estimated timing of the downlink channel received from each BTS. The BTS may measure the time difference between its own time reference for the downlink channel, and the timing of the received signal, transmitted by the MS. This time difference may be understood to be equal to two times the propagation delay between the BTS and the MS. That is, one propagation delay of the synchronization signal from the BTS sent on the downlink channel to the MS, plus one equal propagation delay of the signal transmitted by the MS back to the BTS.

Once the set of TA values are established by the set of one or more BTS used during a given positioning procedure, the position of the device may be derived through a so called Multilateration, or Multilateration procedure, whereby the position of the device may be determined by the intersection of a set of hyperbolic curves associated with each BTS, see FIG. 1. FIG. 1 illustrates a Multilateration procedure involving three base stations, each associated with three TA values, $TA_1$, $TA_2$, and $TA_3$, for a wireless device, located in the center of the image, in the intersection of the indicated set of hyperbolic curves.

The calculation of the position of the device may be typically carried out by the serving positioning node, e.g., a Serving Mobile Location Center (SMLC), which implies that all of the derived timing advance and associated BTS position information may need to be sent to the positioning node that initiated the positioning procedure, that is, the serving positioning node. In some cases, a BTS used during a given positioning procedure may be associated with a non-serving positioning node, in which case the derived timing advance and associated BTS position information available to that BTS may need to be relayed to the serving positioning node.

For the purpose of simplifying the provided herein the following terms may be used according to the descriptions that follow: foreign BTS, local BTS, serving BTS, serving SMLC node, serving Base Station Subsystem (BSS), and non-serving BSS.

A foreign BTS may be understood as a BTS associated with a BSS that uses a positioning node that is different from the positioning node used by the BSS that manages the cell serving the MS when the positioning procedure is initiated. In this case, the derived timing advance information and identity of the corresponding cell is relayed to the serving positioning node using the core network, that is, in this case the BSS has no context for the MS. A context may be understood as information provided to a BSS by the positioning node prior to the positioning node initiating a positioning procedure for a given MS, wherein the BSS manages the cell in which the MS is currently located and wherein the positioning node requests the BSS to begin the positioning procedure for the MS subsequent to providing the BSS with the information used for context establishment. This context information may consist of the logical connection established between the serving BSS and the positioning node established as a result of the serving BSS sending a BSSMAP-LE Perform Location Request message, e.g., as defined in 3GPP TS 49.031 v13.0.0, to the positioning node and/or as a result of the serving BSS sending a BSSMAP-LE Assistance Information Request message, e.g., as defined in 3GPP TS 49.031 v13.0.0, to the positioning node after the logical connection has been established.

A local BTS may be understood as a BTS associated with a different BSS, but still a BSS that uses the same positioning node as the BSS that manages the cell serving the MS when the positioning procedure is initiated. In this case, the derived timing advance information and identity of the corresponding cell is relayed to the serving positioning node using the core network, that is, in this case the BSS has no context for the MS.

A serving BTS may be understood as a BTS associated with a BSS that manages the cell serving the MS when the positioning procedure is initiated. In this case, the derived timing advance information and identity of the corresponding cell is sent directly to the serving positioning node, i.e., in this case the BSS has a context for the MS.

A Serving SMLC node may be understood as the SMLC node that commands a MS to perform the Multilateration procedure, that is, it may send a Radio Resource Location services Protocol (RRLP) Multilateration Request to the MS.

A Serving BSS may be understood as the BSS associated with the serving BTS, that is, the BSS that has context information for the Temporary Logical Link Identity (TLLI) corresponding to a MS, for which the Multilateration procedure has been triggered.

A Non-serving BSS may be understood as a BSS associated with a Foreign BTS, that is, a BSS that does not have context information for the TLLI corresponding to a MS for which the Multilateration procedure has been triggered.

Internet of Things (IoT)

The Internet of Things (IoT) may be understood as an internetworking of communication devices, e.g., physical devices, vehicles, which may also referred to as "connected devices" and "smart devices", buildings and other items— embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use Wi-Fi for remote monitoring. These devices may collect data with the help of various existing technologies and then autonomously flow the data between other devices.

It is expected that in a near future, the population of Cellular IoT devices will be very large. Various predictions exist, among which one assumes that there will be >60000 devices per square kilometer, and another assumes that there will be 1000000 devices per square kilometer. A large fraction of these devices are expected to be stationary, e.g., gas and electricity meters, vending machines, etc.

Extended Coverage (EC)-GSM-IoT and NB-IoT are two standards for supporting Cellular IoT devices that have been specified by 3GPP TSG 3rd Generation Partnership Project (3GPP) Radio Access Network (GERAN) and TSG RAN.

Machine Type Communication (MTC) has in recent years, especially in the context of the Internet of Things (IoT), shown to be a growing market segment for cellular technologies. An MTC device may be a communication device, typically a wireless communication device or simply wireless device, that is a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone. MTC involves communication in a wireless communication network to and/or from MTC devices, which communication typically may be of quite different nature and with other requirements than communication associated with e.g. conventional mobile phones and smart phones. In the context of and growth of the IoT it is evidently so that MTC traffic will be increasing and thus needs to be increasingly supported in wireless communication systems.

A general problem related to (re)using existing technologies and systems is that the requirements for the new type of devices are typically different than conventional requirements, e.g. regarding the type and amount of traffic, performance etc. Existing systems have not been developed with these new requirements in mind. Also, traffic generated by new type of devices will typically be taking place in addition to conventional traffic already supported by an existing system, which existing traffic may typically need to continue to be supported by and in the system, preferably without any substantial disturbance and/or deterioration of already supported services and performance.

Any need of modifications of existing systems and technology may need to be considered with the objective of being cost efficient, such as enabled by low complexity modifications, and preferably allowing legacy devices, i.e. devices already being employed, to continue to be used and co-exist with the new type of devices in one and the same wireless communication system.

Due to the predicted ubiquity of the cellular IoT devices, some of the current standardization procedures are focused on providing for standards for low cost wireless devices, which may have restrictions in their operation, such as limited battery life.

However, existing methods for positioning a wireless device, that is, for determining the geographical location of a wireless device, may lead to wasted time-frequency resources, suboptimal positioning accuracy, and/or unnecessary energy consumption. Existing methods for positioning a wireless device are therefore particularly suboptimal for wireless devices with limited battery life, such as low cost cellular IoT devices.

SUMMARY

It is an object of embodiments herein to improve the positioning procedure of a wireless device in a wireless communications network.

According to a first aspect of embodiments herein, the object is achieved by a method performed by a first network node operating in a wireless communications network. The first network node initiates sending a first paging request to a second network node. The first paging request indicates that a wireless device served by the second network node is to initiate cell reselection prior to sending a first response. The first response is based on the first paging request. The second network node and the wireless device operate in the wireless communications network.

According to a second aspect of embodiments herein, the object is achieved by a method performed by a second network node operating in the wireless communications network. The second network node receives the first paging request from the first network node operating in the wireless communications network. The first paging request indicates that the wireless device served by the second network node is to initiate cell reselection prior to sending the first response based on the first paging request. The first network node and the wireless device operate in the wireless communications network. The first paging request triggers the second network node to initiate sending a second paging request to at least the wireless device. The second paging request is based on the first paging request. The second paging request indicates that the wireless device is to initiate cell reselection prior to sending the first response. The first response is a response to the second paging request.

According to a third aspect of embodiments herein, the object is achieved by a method performed by the wireless device operating in the wireless communications network. The wireless device receives, from the second network node serving the wireless device, the second paging request. The second paging request is based on the first paging request from a first network node in communication with the second network node. The second paging request indicates that the wireless device is to initiate cell reselection prior to sending the first response to the second paging request. The first response is based on the first paging request. The wireless device also sends the first response to the first network node, after having initiated the cell reselection indicated by the second paging request.

According to a fourth aspect of embodiments herein, the object is achieved by the first network node, configured to operate in the wireless communications network. The first network node is further configured to initiate sending the first paging request to the second network node. The first paging request is configured to indicate that the wireless device configured to be served by the second network node is to initiate cell reselection prior to sending the first response. The first response is configured to be based on the first paging request. The second network node and the wireless device are further configured to operate in the wireless communications network.

According to a fifth aspect of embodiments herein, the object is achieved by the second network node, configured to operate in the wireless communications network. The second network node is further configured to receive the first paging request from the first network node configured to operate in the wireless communications network. The first paging request is configured to indicate that the wireless device configured to be served by the second network node is to initiate cell reselection prior to sending the first response based on the first paging request. The first network node and the wireless device are further configured to operate in the wireless communications network. The first paging request is further configured to trigger the second network node to initiate sending the second paging request to at least the wireless device. The second paging request is configured to be based on the first paging request. The second paging request is further configured to indicate that the wireless device is to initiate cell reselection prior to sending the first response. The first response is configured to be the response to the second paging request.

According to a sixth aspect of embodiments herein, the object is achieved by the wireless device, configured to operate in the wireless communications network. The wireless device is further configured to receive, from the second network node configured to be serving the wireless device, the second paging request. The second paging request is configured to be based on the first paging request from the first network node configured to be in communication with the second network node. The second paging request is further configured to indicate that the wireless device is to initiate cell reselection prior to sending the first response to the second paging request. The first response is configured to be based on the first paging request. The wireless device is also configured to send the first response to the first network node, after having initiated the cell reselection configured to be indicated by the second paging request.

By the first network node initiating sending the first paging request to the second network node, the first paging request indicating that the wireless device is to initiate cell reselection prior to sending a first response, the first network node may ensure that the first response sent by the wireless device based on the first paging request, may be sent from the best cell available for serving the wireless device. In turn, the first network node, may be enabled to identify the serving cell based on the reception of the second response, and hence, trigger the positioning procedure, e.g., Multilateration, based on the cell in which the wireless device may actually be located. That is, the first network node may assume the best cell available for serving the wireless device is actually being used by the wireless device when the first network node triggers the positioning procedure. This may enable the first network node to provide the wireless device with more accurate assistance information within the RRLP message it sends to the wireless device to trigger Multilateration, which may enable a more accurate estimation of the position of the wireless device. Further, once the wireless device may perform the positioning procedure, it may be enabled do so with reduced battery consumption. The wireless device may be enabled to consume less battery when transmitting to a network node associated with a cell that is in reality adjacent to the cell in which the wireless device is physically located.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a problem with exiting methods will first be identified and discussed.

Figure 1:
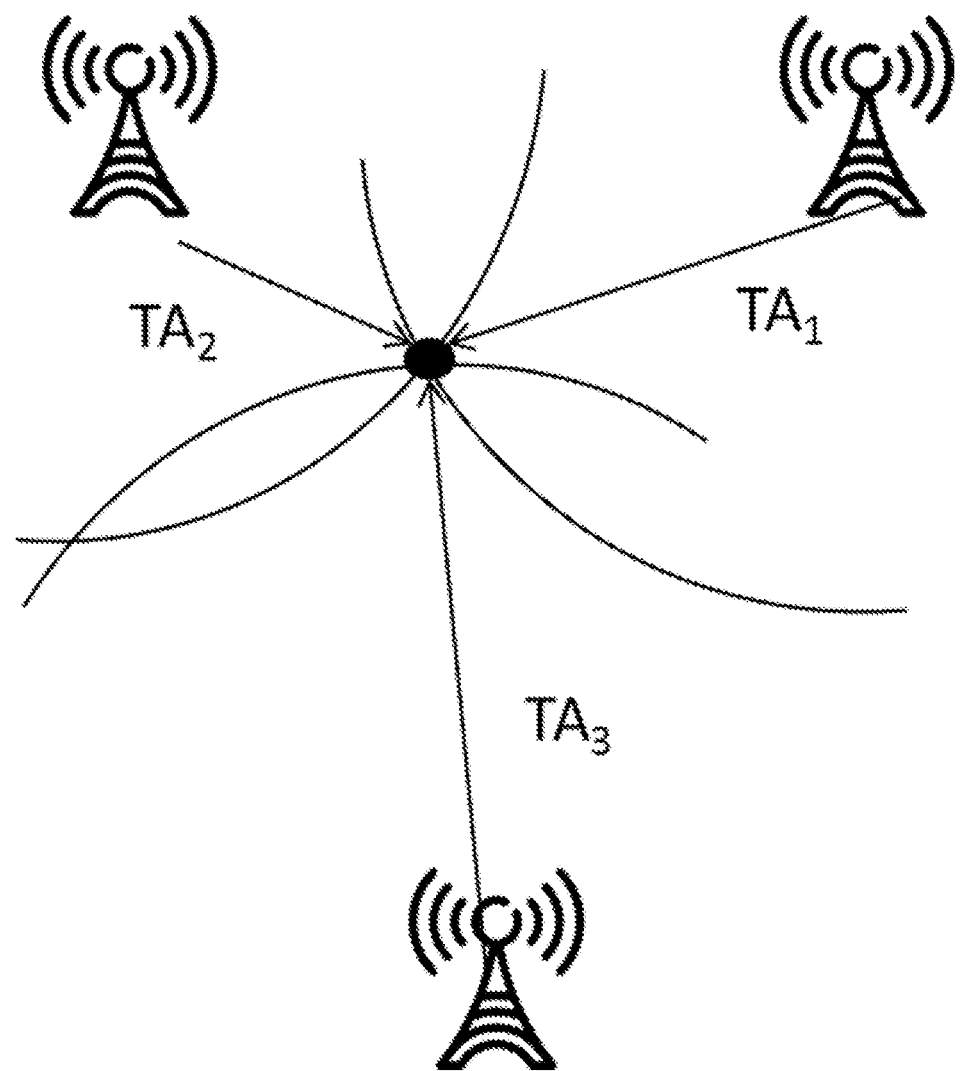
FIG. 1 is a schematic diagram illustrating an example of a Multilateration involving three base stations associated with three timing advance values for a particular device.
Figure 2:
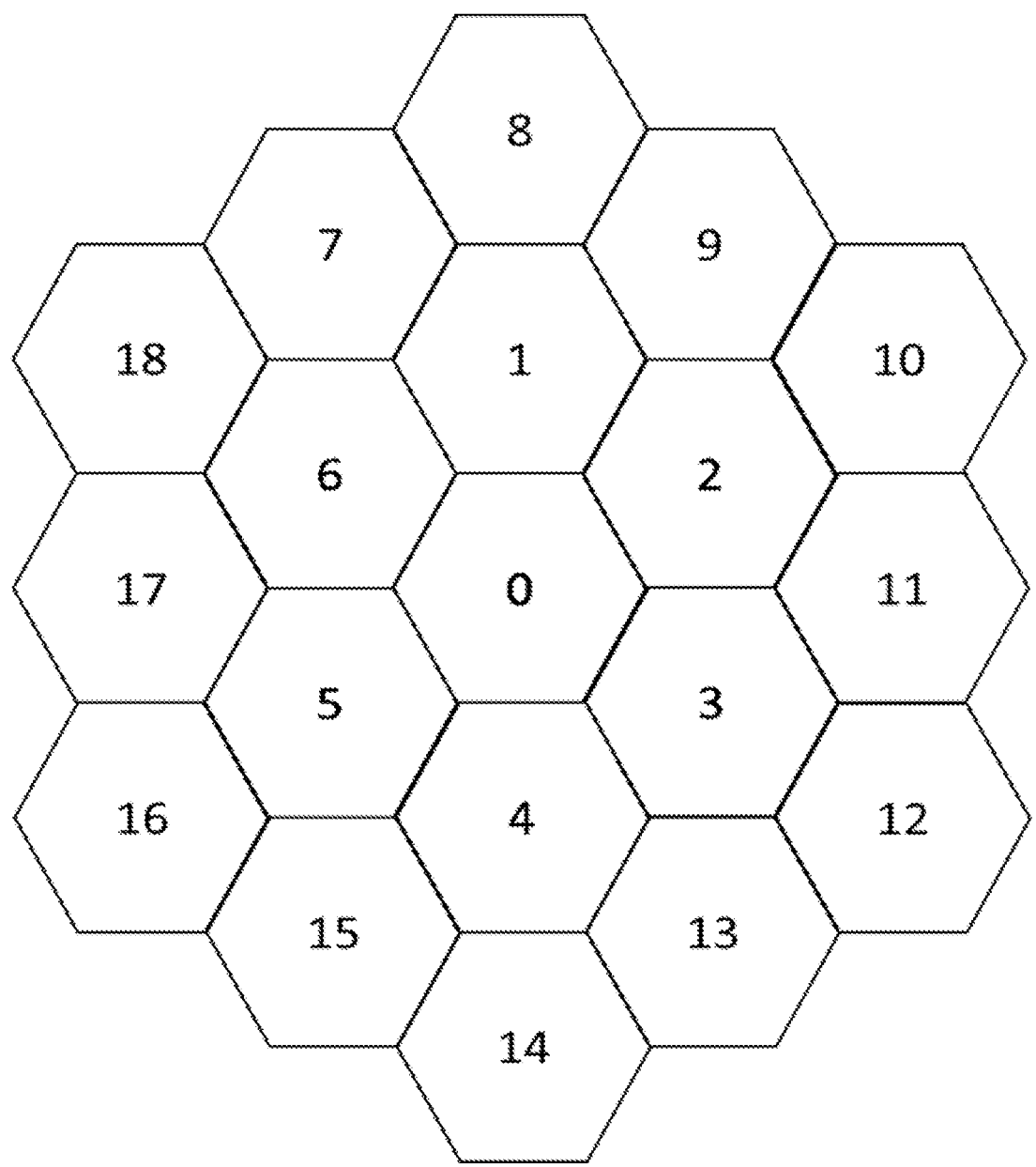
FIG. 2 is a schematic diagram illustrating an example of a cellular network.

According to existing methods, the SMLC may provide guidance information to an MS for performing a positioning procedure such as Multilateration. The assistance information may consist of sets of cells based on SMLC knowledge of the serving cell. The MS may use the assistance information to optimize the set of cells it may select for performing Multilateration, but also to reduce the synchronization to and measurement of neighbor cells. The assistance information may be provided by the network to the MS, e.g., indicated within an RRLP message sent from the serving SMLC to a MS to trigger the positioning procedure in the MS. In Rel-13, a concept called relaxed mobility was introduced for Power Efficient Operation (PEO) and Extended Coverage GSM-IoT (EC-GSM-IoT) devices [3GPP TS 43.064]. In short, relaxed mobility may allow the device to save battery through reduced monitoring of neighbor cells, reduced monitoring of System Information and less frequent triggering of measurements for cell reselection. A consequence of this behavior is that whenever the device experiences some mobility, it may not always be connected to the best cell and, as such, in fact physically be in one cell but connected to a neighboring cell. Another consequence of this in turn is that a positioning algorithm that may provide guidance information to the MS, that is based on identifying cells that surround the cell considered to be the serving cell may then be misguided and provide wrong information. This may in turn lead to higher power consumption and a less accurate estimation of the MS position upon completing the positioning procedure, e.g., see FIG. 2. FIG. 2 is a schematic diagram illustrating an example of a cellular network, where every cell is represented by a hexagon and identified by a number. In FIG. 2, first the device is considered to be camping on cell 0 as well as physically being located in cell 0. The algorithm would then indicate the surrounding cells 1,2,3,4,5, and 6 as assistance data cells. If, on the other hand, the device is actually physically located in cell 0 but is considered to be camping on cell 3, then the positioning node would provide the 0,2,4,11,12 and 13 as assistance data cells. It is thus clear that, in such a scenario, the device would spend energy on synchronizing to and measuring on a set of non-ideal candidates when performing the Multilateration procedure. It may also have to spend additional energy on additional measurements before arriving at a set of candidate cells to be used for Multilateration. Furthermore, such a method may also result in a decrease in positioning accuracy.

Several embodiments are comprised herein, which address this problem. The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Although terminology from the 3rd Generation Partnership Project (3GPP) Radio Access Network (GERAN) has been used in this disclosure to exemplify the embodiments herein, this should not be seen as limiting the scope of the embodiments herein to only the aforementioned system. Other wireless systems, including NB-IoT, Long Term Evolution (LTE) and UMTS implementing Multilateration may also benefit from exploiting the ideas covered within this disclosure. Future radio access ("5G") will support similar or equivalent functionality. Hence, the terms used herein may need to be reinterpreted in view of possible terminology changes in future radio access technologies, such as 5G or younger wireless systems.

Figure 3:
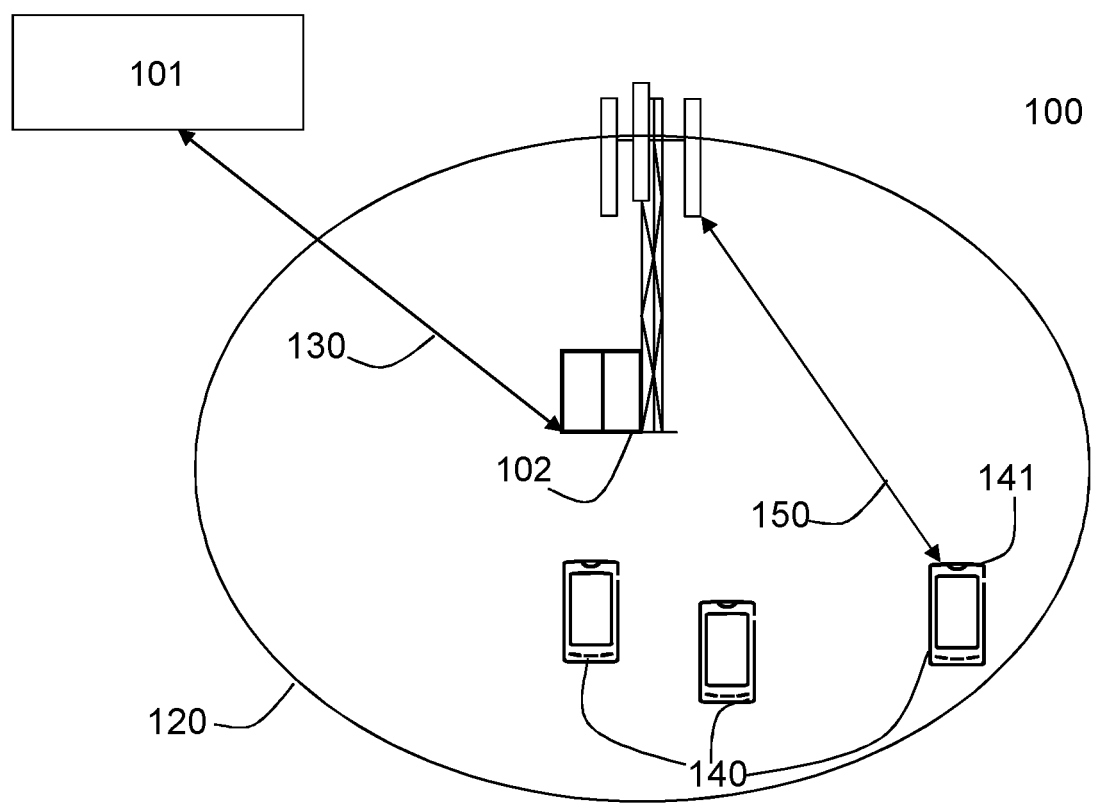
FIG. 3 shows a schematic diagram illustrating an example of a wireless communications network, according to embodiments herein.

FIG. 3 depicts an example of a wireless communications network 100, sometimes also referred to as a wireless communications network, cellular radio system, cellular network or wireless communications system, in which embodiments herein may be implemented. The communications network 100 may for example be a network such as a Global System for Mobile communications (GSM) network, GSM/Enhanced Data Rate for GSM Evolution (EDGE) network, GSM/EDGE Radio Access Network (GERAN) network, IoT, NB-IoT, a GSM based communication network supporting EC-GSM, any 3rd Generation Partnership Project (3GPP) cellular network, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Ultra-Mobile Broadband (UMB), a network comprising of any combination of Radio Access Technologies (RATs) such as e.g. Multi-Standard Radio (MSR) base stations, multi-RAT system etc., Wireless Local Area Network (WLAN) networks, Worldwide Interoperability for Microwave Access (WiMax), WCMDA/HSPA, Code division multiple access 2000 (CDMA2000), 5G system or any cellular network or system.

The communications network 100 comprises a plurality of network nodes, such as a first network node 101, and a second network node 102 depicted in FIG. 3.

The first network node 101 is a network node controlling or managing the actions of the second network node 102. Typically, the first network node 101 may be a core network node, such as, e.g., an SGSN, a Mobility Management Entity (MME), a coordinating node, a Self-Optimizing/Organizing Network (SON) node, a Minimization of Drive Test (MDT) node, etc. . . . . .

The second network node 102 may be a node comprised in a BSS, such as an BSC, or an access node such as a radio base station, BTS, an eNB, an eNodeB, or a Home Node B, a Home eNode B, transmission point, or any other network node capable to serve a wireless device, such as a user equipment or a machine type communication device in the wireless communications network 100. The second network node 102 may support one or several communication technologies, e.g., GSM and/or GSM/EDGE, and its name may depend on the technology and terminology used. The second network node 102 may be directly connected to one or more core networks, which are represented in FIG. 3 by the first network node 101 for the sake of simplicity.

The wireless communications network 100 covers a geographical area which, which in some embodiments may be divided into cell areas, wherein each cell area is served by a network node, although, one network node may serve one or several cells. In the non-limiting example depicted in FIG. 3, the second network node 102 serves a cell 120. The second network node 102 may be of different classes, such as, e.g., macro eNodeB, home eNodeB or pico base station, based on transmission power and thereby also cell size. Typically, the wireless communications network 100 may comprise more cells similar to the cell 120, served by their respective network node. This is not depicted in FIG. 3 for the sake of simplicity. In other examples than those depicted in FIG. 3, wherein the wireless communications network 100 is a non-cellular system, the second network node 102 may serve receiving nodes with serving beams.

The first network node 101 may be different than the second network node 102. This corresponds to the non-limiting particular example illustrated in FIG. 3. Typically, the first network node 101 will be a core network node, such as an SGSN, and the second network node 102 will be the second network node 102, such as any network node in a BSS. This corresponds to the non-limiting particular example illustrated in FIG. 3. In some examples, the first network node 101 may be the same as the second network node 102, e.g., a same radio network node.

In some non-limiting examples, any of the first network node 101 and the second network node 102 may be implemented in a so-called cloud solution, where the first network node 101 may be a so-called virtual node or virtual machine controlling the actions of the second network node 102. Any of the first network node 101 and the second network node 102 may also be implemented in a distributed fashion, wherein the actions described herein as being performed by any of the first network node 101 and the second network node 102 may actually be performed by one or more processors from different nodes communicating in the cloud.

The first network node 101 and the second network node 102 communicate via a first link 130, e.g., a wired link.

The wireless communications network 100 comprises one or more wireless devices 140, wherein three wireless devices, as a non-limiting example, are depicted in FIG. 3 as being located in the wireless communications network 100. The one or more wireless devices 140 comprise at least a wireless device 141. Any of the one or more wireless devices 140 may also be referred to herein as a user equipment or UE. Any of the one or more wireless devices 140 may be, e.g., a wireless communication device such as a MS which may also be known as e.g., mobile terminal, wireless terminal, UE, mobile telephone, cellular telephone, or laptop with wireless capability, or any of the "Things" in an IoT system described earlier, just to mention some further examples. Any of the one or more wireless devices 140 may be, for example, portable, pocket-storable, hand-held, computer-comprised, or a vehicle-mounted mobile device, enabled to communicate voice and/or data, via the RAN, with another entity, such as a server, a laptop, a PDA, or a tablet computer, sometimes referred to as a tablet with wireless capability, Machine-to-Machine (M2M) device, device equipped with a wireless interface, such as a printer or a file storage device, modem, or any other radio network unit capable of communicating over a wired or radio link in a communications system. Any of the one or more wireless devices 140 is enabled to communicate wirelessly in the wireless communications network 100. The communication may be performed e.g., via a RAN and possibly one or more core networks, comprised within the wireless communications network 100.

The wireless device 141 is configured to communicate within the wireless communications network 100 with the first network node 101 via the second network node 102. The wireless device 141 is configured to communicate with the second network node 102 over a second link 150, e.g., a radio link in the cell 120. Any of the one or more wireless devices 140 is configured to communicate with a respective network node, e.g., the second network node 102 with a similar link to the second link 150. This is not depicted in FIG. 3 to simplify the Figure.

In general, the usage herein of "first", "second", and/or "third", may be understood to be an arbitrary way to denote different elements, and may be understood to not confer a cumulative or chronological character to the nouns they modify.

Examples of embodiments herein provided below will be described with GSM/EDGE as the wireless communications network 100. The first network node 101 may be exemplified with an SGSN, but generally it may be another core network node serving the wireless device 141 as well. For example, for NB-IoT, the applicable core network node may also be an MME. The second network node 102, controller node, may be exemplified with a BSS and the wireless device 141 may be exemplified with a mobile station, sometimes also referred to as the device. The positioning node may be exemplified with an SMLC node but may, e.g., for NB-IoT be an E-SMLC node.

In the following description, any reference to a/the core network node or a/the SGSN is understood to equally refer to the first network node 101. Any reference herein to a/the radio access network node or a/the BSS is understood to refer to the second network node 102. Any reference herein to a/the communication device, a/the device or a/the MS is understood to equally refer to the wireless device 141. Any reference herein to more than one MS is understood to equally refer to the one or more wireless devices 140. The first paging request may be referred to herein as a paging request. The second paging request may be referred to herein as a paging request message or "corresponding paging request message". The first response may be referred to herein as a "page response".

Figure 4:
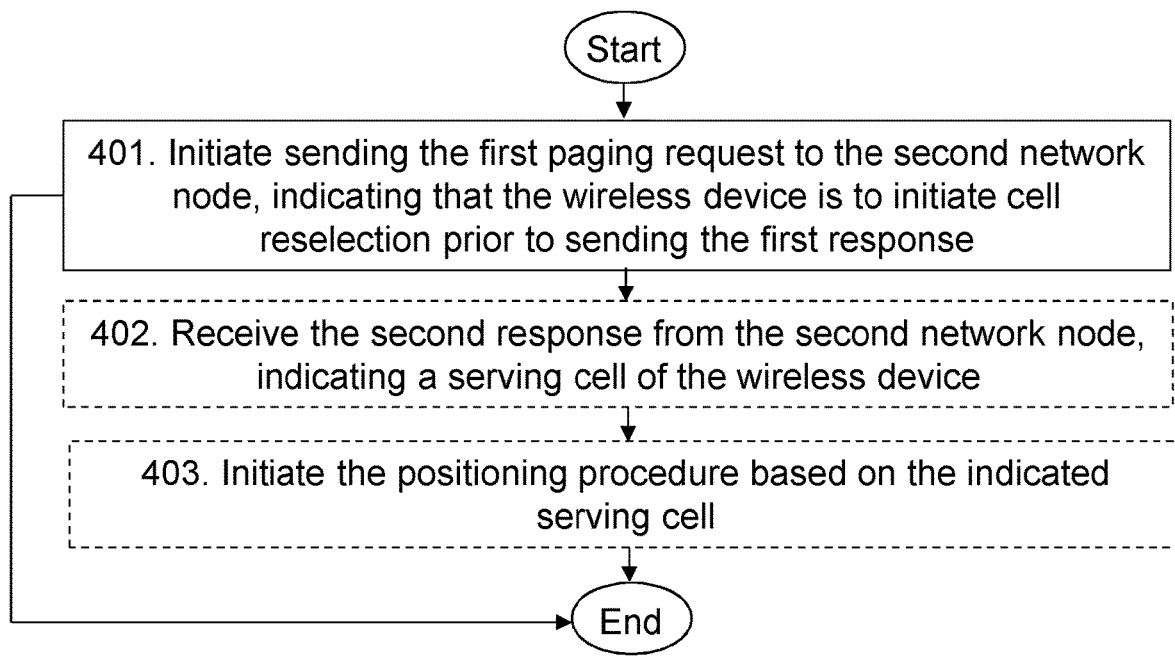
FIG. 4 shows a flowchart illustrating an embodiment of a method in a first network node, according to embodiments herein.

Embodiments of method performed by the first network node 101, will now be described with reference to the flowchart depicted in FIG. 4. The first network node 101 operates in the wireless communications network 100. The method may be understood to be for handling a positioning procedure.

Figure 7:
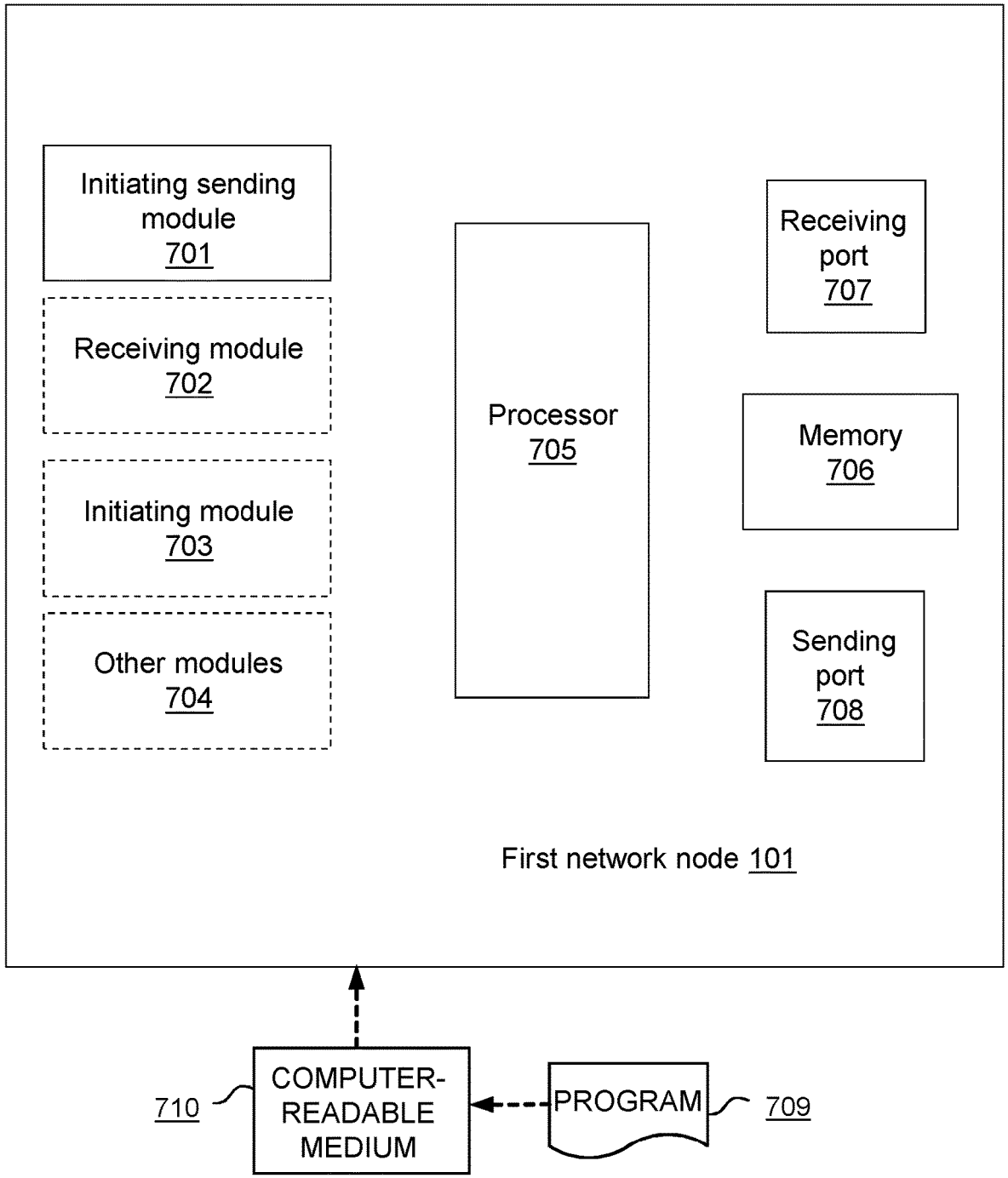
FIG. 7 is a schematic block diagram illustrating embodiments of a first network node, according to embodiments herein.

The method may comprise the actions described below. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 7, optional actions are indicated with dashed boxes.

Action 401

In order to allow the network to provide the wireless device 141 with more accurate assistance information to perform a positioning procedure such as Multilateration, it may be beneficial for the first network node 101 to identify a cell in which the wireless device 141 is actually physically located when performing the positioning procedure. For this purpose, in this Action 401, the first network node 101 initiates sending a first paging request to the second network node 102. The first paging request indicates that the wireless device 141 in communication with, e.g., served by the second network node 102 is to initiate cell reselection prior to sending a first response. The first response is based on the first paging request. The second network node 102 and the wireless device 141 operate in the wireless communications network 100.

Initiating sending may be understood as sending itself, or triggering the sending by another network node in communication with the first network node 101, e.g., in a distributed node environment. The sending may be performed e.g., via the first link 130.

That the first paging request indicates that the wireless device 141 is to initiate cell reselection prior to sending the first response, may be understood to comprise indicating to the second network node 102 that a second paging request to be sent by the second network node 102 to the wireless device 141, as described below, is to indicate that the wireless device 141 is to initiate cell reselection prior to sending the first response.

Initiating cell reselection may be understood as triggering one or more measurements by e.g., the wireless device 141 from one or more cells in the wireless communications network 100, e.g., neighboring cells, to determine a serving cell. The performance of the cell reselection may establish a new serving cell for the wireless device 141 or verify that the current serving cell is the best serving cell. That is, the cell providing the best radio coverage according to some criteria.

The benefit of indicating that the wireless device 141 is to first perform cell reselection is that the wireless device 141 will be in the best serving cell from a battery consumption perspective and, therefore, consume less battery when it subsequently performs Multilateration, wherein the wireless device 141 may transmit to BTSs associated with cells that are in reality adjacent to the cell in which the wireless device 141 is physically located.

In some embodiments, the first paging request may further indicate that the wireless device 141 is to be paged for a positioning procedure. In embodiments herein, the positioning procedure may be a multilateration procedure.

The first paging request may trigger the second network node 102 to initiate sending a second paging request to the wireless device 141, wherein the first response may be understood to be to the second paging request, and the second paging request is to indicate that the wireless device 141 is to initiate cell reselection prior to sending the first response to the second paging request.

That the first response is based on the first paging request, may be understood as that it is sent in response to the second paging request. However, it may be understood to be in fact triggered by the first paging request.

That the second paging request may be based on the first paging request may be understood as that the second network node 102 may translate the first paging request into the second paging request before sending it to the wireless device 141. The second network node 102 may for example bundle a plurality of first paging requests, each for a respective wireless device of the one or more wireless devices 140, into a single second paging request sent for the one or more wireless devices 140.

The second paging request may be referred to herein as a "paging request message".

A value of a first information element comprised in the first paging request may indicate to the second network node 102 that the second paging request is to further indicate that the wireless device 141 is being paged for the positioning procedure. The first information element may be understood as a new information element disclosed herein, which may be called "Multilateration Information".

In some examples, the first paging request sent by the first network node 101 may be comprised in a Paging Protocol Data Unit Specific Protocol Data Unit, PAGING-PS PDU.

First Example

In a first example, a new information element called "Multilateration Information" may be added to the PAGING-PS PDU whenever the first network node 101, e.g., an SGSN may send a paging request to the second network node 102 for the purpose of establishing a connection with a device (MS) such as the wireless device 141 for the purpose of Multilateration, see the last information element in the table below. The presence of this IE may indicate to the second network node 102 that the corresponding Paging Request message, that is, the second paging request, sent across the radio interface should indicate paging for Multilateration.

| Information elements | Type/Reference | Presence | Format | Length |
|---|---|---|---|---|
| PDU type | PDU type/11.3.26 | M | V | 1 |
| IMSI | IMSI/11.3.14 | M | TLV | 5-10 |
| DRX Parameters (note 3) | DRX Parameters/11.3.11 | O | TLV | 4 |
| BVCI (note 1) | BVCI/11.3.6 | C | TLV | 4 |
| Location Area (note 1) | Location Area/11.3.17 | C (note 2) | TLV | 7 |
| Routeing Area (note 1) | Routeing Area/11.3.31 | C (note 2) | TLV | 8 |
| BSS Area Indication (note 1) | BSS Area Indication/11.3.3 | C | TLV | 3 |
| PFI | PFI/11.3.42 | O | TLV | 3 |
| ABQP | ABQP/11.3.43 | O | TLV | 13-? |
| QoS Profile | QoS Profile/11.3.28 | M | TLV | 5 |
| P-TMSI | TMSI/11.3.36 | O | TLV | 6 |
| eDRX Parameters (note 3) | eDRX Parameters/11.3.122 | O | TLV | 3 |

-continued

| Information elements | Type/Reference | Presence | Format | Length |
|---|---|---|---|---|
| Coverage Class | Coverage Class/11.3.124 | O | TLV | 3 |
| Cell Identifier (note 4) | Cell Identifier/11.3.9 | O | TLV | 10 |
| MS Radio Access Capability (note 5) | MS Radio Access Capability/11.3.22 | O | TLV | 7-? |
| Paging Attempt Information | Paging Attempt Information/11.3.125 | O | TLV | 3 |
| Multilateration Information (note 6) | Multilateration Information/11.3.xxx | O | TLV | 3 |

(note 1):
One and only one of the conditional IEs shall be present. No repeated instances of the conditional IEs are permissible (e.g. one and only one Location Area shall be present).
(note 2):
When network sharing is supported, the PLMN included in the Location Area/Routeing Area elements can be either the Common PLMN or an Additional PLMN (see 3GPP TS 44.018 [25]).
(note 3):
If the SGSN has valid eDRX Parameters for a TLLI it shall include the eDRX Parameters IE in which case the DRX Parameters IE shall not be included. For the case where PSM is enabled with eDRX and the Active timer is running the SGSN shall always include the negotiated eDRX value in the eDRX Parameters IE.
(note 4):
The cell identity for the cell where the Coverage Class was reported by the MS shall be included if available in SGSN.
(note 5):
The field shall be present if there is valid MS Radio Access Capability information for the MS known by the SGSN; the field shall not be present otherwise.
(note 6):
The field shall be present if the paging request is sent for the purpose of establishing a connection with a device for the purpose of Multilateration.

Action 402

In some embodiments, the first network node 101, in this Action 402, may receive a second response from the second network node 102. The second response may be based on the first paging request and on the first response. The second response may indicate the serving cell of the wireless device 141. The indicated serving cell may be based on the cell reselection, that is, it may be the new serving cell mentioned above. The receiving may be performed e.g., via the first link 130.

The second response may be understood to be based, as a relayed response by the second network node 102, on the first response from the wireless device 141 received by the second network node 102. Although the wireless device 141 may not directly receive the first paging request from the first network node 101, but instead may receive the second paging request sent by the second network node 102, the first response from the wireless device 141 to the second paging request may be understood to be based on, e.g., triggered by, initiated by, the first paging request. Similarly, the second response sent by the second network node 102 may be understood to be based on, e.g., triggered by, initiated by, the first paging request.

In some embodiments, the received second response may further indicate that the second response is based on the first response from the wireless device 141 responding to a second paging request indicating a positioning procedure.

Action 403

The first network node 101, upon identifying the serving cell based on reception of the second response, may be able to trigger Multilateration based on a cell in which the wireless device 141 is actually physically located. Accordingly, in some embodiments, the first network node 101, in this Action 403, may initiate the positioning procedure based on the indicated serving cell in Action 402. Initiating the positioning procedure may be understood as sending information to a positioning node, e.g., SMLC, for positioning of the wireless device 141.

In some embodiments, the first network node 101 is an SGSN, the second network node 102 is comprised in a BSS, the wireless device 141 is a mobile station, and the wireless communications network 100 is a GERAN network.

Figure 5:
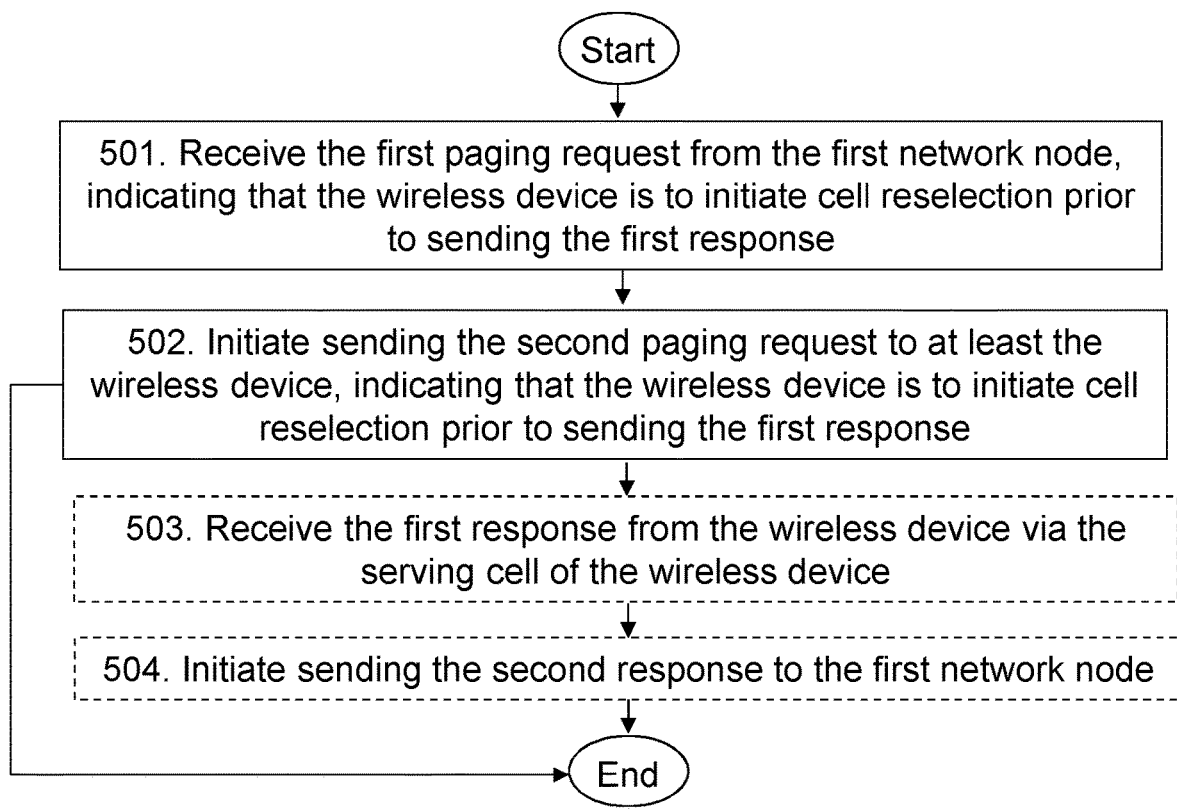
FIG. 5 shows a flowchart illustrating an example of embodiments of a method in a second network node, according to embodiments herein.

Embodiments of a method performed by the second network node 102, will now be described with reference to the flowchart depicted in FIG. 5. The second network node 102 operates in the wireless communications network 100. The method may be understood to be for handling a positioning procedure.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, optional actions are indicated with dashed boxes.

The detailed description of some of the following corresponds to the same references provided above, in relation to the actions described for the first network node 101, and will thus not be repeated here to simplify the description. For example, the positioning procedure may be the multilateration procedure.

Action 501

In order for the second network node 102 in this Action 501, the second network node 102 receives the first paging request from the first network node 101 operating in the wireless communications network 100. The first paging request indicates that the wireless device 141 served by the second network node 102 is to initiate cell reselection prior to sending the first response based on the first paging request. The first network node 101 and the wireless device 141 operate in the wireless communications network 100.

Receiving, may be understood as directly receiving, or indirectly receiving via another network node in communication with the second network node 102, e.g., in a distributed node environment. The receiving may be performed e.g., via the first link 130.

The first paging request may further indicate that the wireless device 141 is to be paged for the positioning procedure. In embodiments herein, the positioning procedure may be the multilateration procedure.

In some embodiments, the received first paging request may be comprised in a PAGING-PS PDU.

Action 502

The first paging request triggers the second network node 102 to, in this Action 502, initiate sending the second paging request to at least the wireless device 141. The second paging request is based on the first paging request. The second paging request indicates that the wireless device 141 is to initiate cell reselection prior to sending the first response. The first response is a response to the second paging request. The sending may be performed e.g., via the second link 150.

As mentioned earlier, that the second paging request may be based on the first paging request may be understood as that the second network node 102 may translate the first paging request into the second paging request before sending it to the wireless device 141. In some examples, the second network node 102 may bundle several first paging requests, each for a respective wireless device, into a single second paging request.

The first paging request, as described earlier, may be understood to indicate to the second network node 102 that the wireless device 141 is to initiate cell reselection prior to sending the first response using the value of a first information element comprised in the first paging request.

The value of the first information element may further indicate to the second network node 102 that the second paging request is to further indicate that the wireless device 141 is being paged for the positioning procedure.

In some embodiments, the second paging request may indicate that the one or more wireless devices 140 comprising the wireless device 141 are to initiate cell reselection prior to sending a respective first response to the second paging request by one of the following: a) a value of a second information element comprised in the second paging request, the second information element being a skip indicator, as e.g., illustrated below in the second example, b) an extension to a third information element comprised in the second paging request, as e.g., illustrated below in the third example, and c) a fourth information element comprised in the second paging request, the fourth information element being an identity indicator dedicated to paging the one or more wireless devices 140 for positioning, as e.g., illustrated below in the fourth example.

In some embodiments, any of: a) the value of the second information element, b) the extension to the third information element, and c) the fourth information element, may further indicate that the one or more wireless devices 140 are being paged for the positioning procedure.

Second Example

In a second example, the Skip indicator, e.g., see sub-clause 10.3.1 in TS 44.018, may be used to signal that the PAGING REQUEST TYPE 1, 2 and 3 messages may be sent for the purpose of establishing a connection with the wireless device 141 for the purpose of Multilateration. See the example below for details, where different values of the skip indicator are used to indicate which identity in the respective message is paged for Multilateration. Note that, to any skilled in the art, alternative codings to those shown below, with similar meaning, may be possible.

For PAGING REQUEST TYPE 1 message the bit may e.g., have the following meaning.

| Skip Indicator | Interpretation |
| --- | --- |
| 0001 | Mobile Identity 1 paged for Multilateration |
| 0010 | Mobile Identity 2 paged for Multilateration |
| 0011 | Both identities paged for Multilateration |
| 0011-1111 | Reserved |

For PAGING REQUEST TYPE 2 message, the bit may e.g., have the following meaning.

| Skip Indicator | Interpretation |
| --- | --- |
| 0001 | Mobile Identity 1 paged for Multilateration |
| 0010 | Mobile Identity 2 paged for Multilateration |
| 0011 | Mobile Identity 1 and 2 paged for Multilateration |
| 0100 | Mobile Identity 3 paged for Multilateration |
| 0101 | Mobile Identities 1 and 3 paged for Multilateration |
| 0111 | Mobile Identities 1, 2 and 3 paged for Multilateration |
| 1000-1111 | Reserved |

For PAGING REQUEST TYPE 3 message, the bit may e.g., have the following meaning.

| Skip Indicator | Interpretation |
| --- | --- |
| 0001 | Mobile Identity 1 paged for Multilateration |
| 0010 | Mobile Identity 2 paged for Multilateration |
| 0011 | Mobile Identity 1 and 2 paged for Multilateration |
| 0100 | Mobile Identity 3 paged for Multilateration |
| 0101 | Mobile Identities 1 and 2 paged for Multilateration |
| ... | |
| 1000 | Mobile Identity 4 paged for Multilateration |
| ... | |
| 1111 | All four Identities paged for Multilateration |

When an MS such as the wireless device 141 may be paged for Multilateration, the cell re-selection procedure may be first invoked before providing the first response.

Third Example

In a third example, a Rel-14 addition may be included in already existing messages, wherein the extension may indicate if and which identity in any given paging message is paged for Multilateration. An example is given below for PAGING REQUEST TYPE 3 (P3 rest octets) and for EC-PAGING REQUEST messages, where the new proposed additions are named "MULTILATERATION_BITMAP".

To anyone skilled in the art, the corresponding extensions to PAGING REQUEST TYPE 1 and PAGING REQUEST TYPE 2 may be considered trivial.

Example for PAGING REQUEST TYPE 3 Message

```
< P3 Rest Octets > ::=
    {L | H < CN3 : bit (2) > < CN4 : bit (2) >}
    {L | H < NLN(PCH) : bit (2) > < NLN status(PCH) : bit >}
    {L | H < Priority1 ::= Priority >}
    {L | H < Priority2 ::= Priority >}
    {L | H < Priority3 ::= Priority >}
    {L | H < Priority4 ::= Priority >}
```

```
{   null    | L          -- Receiver compatible with earlier release
            | H              -- Additions in Release 10
                < Implicit Reject CS : bit >
                < Implicit Reject PS : bit >
}
{   null    | L          -- Receiver compatible with earlier
                             release
            | H          -- Additions in Release 11
                < IPA Support: bit >
}
{   null    | L          -- Receiver compatible with earlier
                             release
            | H          -- Additions in Release 13
                < PEO_BCCH_CHANGE_MARK : bit (2) >
                < RCC : bit (3) >
}
{   null    | L          -- Receiver compatible with earlier
                             release
            | H          -- Additions in Release 14
                < MULTILATERATION_BITMAP : bit (4) >
}
    < spare padding >;
} //     -- truncation according to sub-clause 8.9 is allowed, bits 'L'
         assumed
< Priority > ::= < bit(3) >;
```

MULTILATERATION_BITMAP (4 bit field)
This field contains a bitmap indicating which identities in the Paging Request Type 3 message that is paged for Multilateration.
The MULTILATERATION_BITMAP field is coded as follows.
Bits
4 3 2 1
x x x x      MS Identity 1 MS Identity 2 MS Identity 3 MS Identity 4

Example for EC PAGING REQUEST Message

```
< EC Paging Request message content > ::=
    < Message Type : bit (4) >
        < Used DL Coverage Class: bit (2) >
        { 0 | 1 < EC Page Extension ; bit (4) > }
        < Mobile Identity 1 : < Mobile Identity struct >>
        { 0 | 1 < Mobile Identity 2 : < Mobile Identity struct >> }
{   null        | L          -- Receiver compatible with earlier
                                 release
                | H          -- Additions in Release 14
                    < MULTILATERATION_BITMAP : bit (2) >
}
    <spare padding> ;
< Mobile Identity struct > ::=
        { 0 < P-TMSI : bit (32) >
        | 1     < Number of IMSI Digits : bit (4) >
                < IMSI Digits : bit (4 * (val(Number of IMSI
                    Digits) + 1)) > } ;
```

MULTILATERATION_BITMAP (2 bit field)
This field contains a bitmap indicating which identities in the EC PAGING REQUEST message that is paged for Multilateration.
The MULTILATERATION_BITMAP field is coded as follows.
Bits
2 1
x x          MS Identity 1 MS Identity 2

When an MS such as the wireless device 141 may be being paged for Multilateration, the cell re-selection procedure may be first invoked before providing the first response.

Fourth Example

In a fourth example, completely new messages, that is, new message types, may be introduced on the Paging CHannel (PCH) and Extended Coverage Paging Channel (EC-PCH), to be used whenever one or more devices may be being paged for Multilateration. When constructing such new messages, complete freedom exists, it may be possible to e.g., introduce a new message that contains a single MS identity to be used only when paging for multilateration. However, irrespective of the detailed coding, an MS such as the wireless device 141 paged for Multilateration may invoke the cell re-selection procedure before providing the first response in order to ensure that the device is camping on the best cell.

Action 503

In some embodiments, the second network node 102 may, in this Action 503, receive the first response to the second paging request from the wireless device 141 via the serving cell of the wireless device 141, the serving cell having been determined based on the initiated performance of the cell reselection.

Receiving, may be understood as directly receiving, or indirectly receiving via another network node in communication with the second network node 102, e.g., in a distributed node environment. The receiving may be performed e.g., via the second link 150.

Action 504

In some embodiments, the second network node 102 may, in this Action 504, initiate sending, to the first network node 101, the second response based on the received first response. The sending may be performed e.g., via the first link 130.

In some embodiments, the first network node 101 may be an SGSN, the second network node 102 may be comprised in a BSS, the wireless device 141 may be a mobile station, and the wireless communications network 100 may be a GERAN network.

Figure 6:
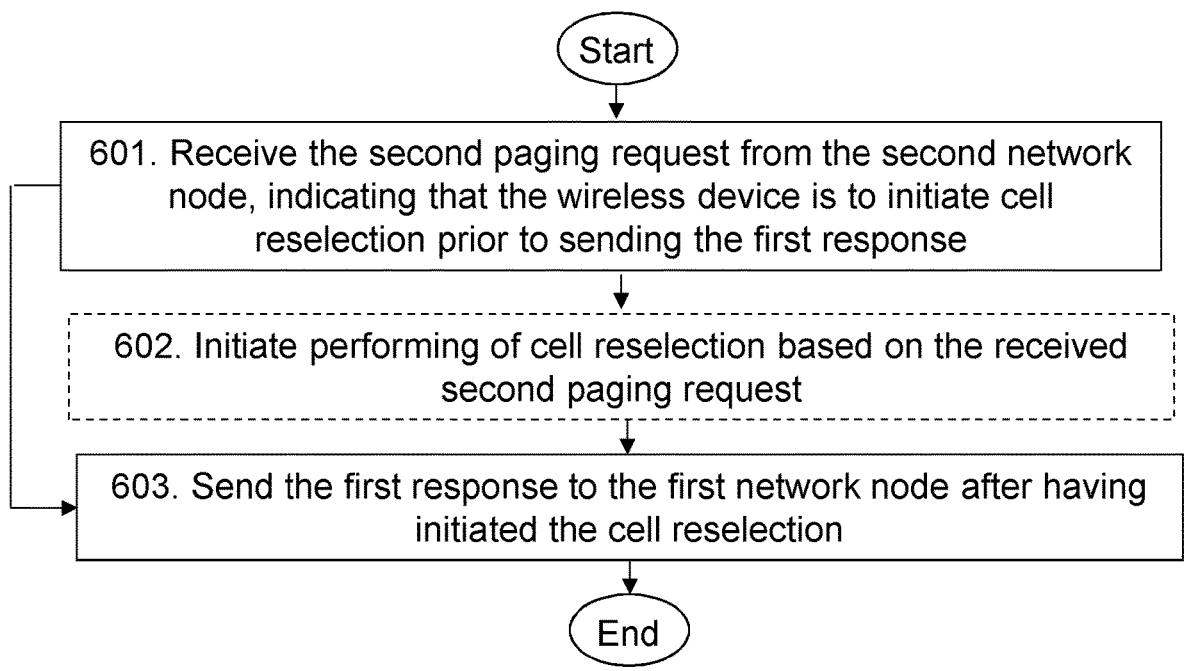
FIG. 6 shows a flowchart illustrating an example of embodiments of a method in a wireless device, according to embodiments herein.

Embodiments of a method performed by the wireless device 141, will now be described with reference to the flowchart depicted in FIG. 6. The method may be understood to be for handling a positioning procedure. The wireless device 14 is operating in the wireless communications network 100.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 6, optional actions are indicated with dashed boxes.

The detailed description of some of the following corresponds to the same references provided above, in relation to the actions described for the first network node 101, and will thus not be repeated here to simplify the description. For example, the positioning procedure may be the multilateration procedure.

Action 601

The wireless device 141, in this Action 601, receives, from the second network node 102 in communication with, e.g., serving the wireless device 141, the second paging request. The second paging request is based on the first paging request from the first network node 101 in communication with the second network node 102. The second paging request indicates that the wireless device 141 is to initiate cell reselection prior to sending the first response to the second paging request, the first response being based on the first paging request.

The receiving may be performed e.g., via the second link 150.

The second paging request may indicate that the wireless device 141 is being paged for the positioning procedure.

The first paging request may be comprised in the PAGING-PS PDU.

In some embodiments, the second paging request may indicate that the one or more wireless devices 140 comprising the wireless device 141 are to initiate cell reselection prior to sending the respective first response to the second paging request by one of the following: a) the value of the second information element comprised in the second paging request, the second information element being the skip indicator, b) the extension to the third information element comprised in the second paging request, and c) the fourth information element comprised in the second paging request, the fourth information element being the identity indicator dedicated to paging the one or more wireless devices 140 for positioning.

In some embodiments, any of: a) the value of the second information element, b) the extension to the third information element, and c) the fourth information element, may further indicate that the one or more wireless devices 140 are being paged for the positioning procedure.

Action 602

In this Action 602, the wireless device 141 may initiate performing cell reselection based on, e.g., triggered by, the received second paging request.

Action 603

The wireless device 141, in this Action 603, sends the first response to the first network node 101, after having initiated the cell reselection indicated by the second paging request. The sending 603 may be performed e.g., via the second link 150 and the first link 130.

The sending in this Action 603 of the first response, may be performed via the second network node 102, e.g., via the serving cell of the wireless device 141, the serving cell having been determined based on the initiated performance of the cell reselection.

Sending 603 the first response to the first network node 101 may be understood to comprise sending the first response to the second network node 102, which may then be processed by the second network node 102 into the second response, and sent further as such to the first network node 101. That is, sending 603 the first response to the first network node 101 may be understood as initiating sending the second response to the first network node 101.

That the serving cell is determined based on the initiated performance of the cell reselection may be understood as that the serving cell is determined after the performance of the cell reselection, or based on a result of the performance of the cell reselection.

In some embodiments, the first network node 101 may be an SGSN, the second network node 102 may be comprised in a BSS, the wireless device 141 may be a mobile station, and the wireless communications network 100 may be a GERAN network.

Summarized Overview of Embodiments Herein

To summarize some of the foregoing in other words, after performing cell reselection to establish a new serving cell, or at least verify the current serving cell is the best serving cell, the wireless device 141 may send the first response therein, and the network may use the indicated serving cell as the basis for triggering Multilateration. In this respect, examples herein may be understood as methods for enabling a positioning node, e.g., in the wireless communications network 100, to provide more accurate assistance information to the wireless device 141 to perform a positioning procedure such as Multilateration. The wireless device 141 may use the assistance information to optimize the set of cells it may select for performing Multilateration but also to reduce the time required to synchronize to and perform measurements of neighbor cells. While performing Multilateration, the wireless device 141 may send an access request, that is, after it may send the first (page) response and receive a subsequent RRLP message that may trigger it to perform Multilateration. The access request, e.g., which may be sent on the Random Access Channel (RACH) or Extended Coverage Random Access Channel (EC-RACH), or the Radio Link Control (RLC) data block containing the page response, e.g., a short Logical Link Control (LLC) PDU, may provide information that indicates the page response was sent in response to a Paging Request message indicating "Timing Advance Multilateration". This may allow the page response to be conveyed to the core network such as the first network node 101, e.g., SGSN, along with an indication of "Timing Advance Multilateration", which may mean the core network may still accept and act on the page response, e.g., send a BSSGP PERFORM-LOCATION-REQUEST to the BSS managing the indicated serving cell, even if it did not send a corresponding Paging Request for the indicated serving cell.

In a particular example, an optional Information Element, e.g., "Multilateration Information", may be added to the PAGING-PS PDU whenever the first network node 101 may send the first paging request to the BSS for establishing a connection with the wireless device 141 for Multilateration. The presence of this IE may indicate to the BSS that the corresponding Paging Request message sent across the radio interface should indicate paging for Multilateration.

In another particular example, bit(s) may be included in the Paging Request messages which indicate to the wireless device 141 that it is being paged for the purpose of "Timing Advance Multilateration". The bit(s) may serve as notification to the wireless device 141 that it should trigger the cell reselection procedure prior to sending a page response to ensure that the page response is sent from the best cell.

According to the foregoing, some examples herein may be understood to relate to a method for triggering cell re-selection when paging a device for Multilateration.

One advantage of examples herein is that, with the proposed bit(s) in the PAGING-PS PDU and in the second paging request, e.g., a Paging Request message, the network, the first network node 101, upon identifying a serving cell based on reception of the first response, may be able to trigger Multilateration based on a cell in which the wireless device 141 is actually physically located. This may allow the network to provide the wireless device 141 with more accurate assistance information within the RRLP message it may send to the wireless device 141 to trigger Multilateration, which in turn, implies reduced battery consumption for the wireless device 141 when performing Multilateration and allows the SMLC, upon receiving positioning information for the set of cells used by the wireless device 141 for performing Multilateration, to more accurately estimate the position of the wireless device 141 due to the positioning information being derived from a wireless device 141 in close proximity to the used set of cells. That is, the benefit of the wireless device 141 first performing cell reselection is that the wireless device 141 will be in the best serving cell from a battery consumption perspective and, therefore, consume less battery when it subsequently performs Multilateration wherein it may transmit to BTSs associated with cells that are in reality adjacent to the cell in which it is physically located. That is, the wireless device 141 will be operating in a cell wherein it will have to use the least amount of battery for communicating with the BTS managing its serving cell.

To perform the method actions described above in relation to FIG. 4, the first network node 101 may comprise the following arrangement depicted in FIG. 7. The first network node 101 is configured to operate in a wireless communications network 100.

The detailed description of some of the following corresponds to the same references provided above, in relation to the actions described for the first network node 101, and will thus not be repeated here. For example, the positioning procedure may be a multilateration procedure.

The first network node 101 is configured to, e.g. by means of an initiating sending module 701 within the first network node 101 configured to, initiate sending the first paging request to the second network node 102. The first paging request is configured to indicate that the wireless device 141 configured to be served by the second network node 102 is to initiate cell reselection prior to sending the first response, the first response being configured to be based on the first paging request. The second network node 102 and the wireless device 141 are further configured to operate in the wireless communications network 100. The initiating sending module 701 may be a processor 705 of the first network node 101, or an application running on such processor.

In some embodiments, the first paging request may be further configured to indicate that the wireless device 141 is to be paged for the positioning procedure.

The first paging request may be configured to trigger the second network node 102 to initiate sending the second paging request to the wireless device 141, wherein the first response is to the second paging request. The second paging request may be configured to indicate that the wireless device 141 is to initiate cell reselection prior to sending the first response to the second paging request. The value of the first information element comprised in the first paging request may be configured to indicate to the second network node 102 that the second paging request is to further indicate that the wireless device 141 is being paged for the positioning procedure.

In some embodiments, the first network node 101 may be configured to, e.g. by means of the receiving module 702 within the first network node 101 configured to, receive the second response from the second network node 102. The second response may be configured to be based on the first paging request and on the first response. The second response may be configured to indicate the serving cell of the wireless device 141. The indicated serving cell may be configured to be based on the cell reselection. The receiving module 702 may be the processor 705 of the first network node 101, or an application running on such processor.

The second response configured to be received may be configured to further indicate that the second response is based on the first response from the wireless device 141 configured to respond to the second paging request configured to indicate the positioning procedure.

In some embodiments, the first network node 101 may be configured to, e.g. by means of an initiating module 703 within the first network node 101 configured to, initiate the positioning procedure based on the indicated serving cell. The initiating module 703 may be the processor 705 of the first network node 101, or an application running on such processor.

In some embodiments, the first paging request configured to be sent by the first network node 101 may be configured to be comprised in the PAGING-PS PDU.

In some embodiments, the first network node 101 may be an SGSN, the second network node 102 may be comprised in a BSS, the wireless device 141 may be a mobile station, and the wireless communications network 100 may be a GERAN network.

Other modules 704 may be comprised in the first network node 101.

The embodiments herein may be implemented through one or more processors, such as a processor 705 in the first network node 101 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the first network node 101. One such carrier may be in the form of a CD ROM disc. It is however feasible with other data carriers such as a memory stick. The computer program code may furthermore be provided as pure program code on a server and downloaded to the first network node 101.

The first network node 101 may further comprise a memory 706 comprising one or more memory units. The memory 706 is arranged to be used to store obtained information, store data, configurations, schedulings, and applications etc. to perform the methods herein when being executed in the first network node 101.

In some embodiments, the first network node 101 may receive information from, e.g., the second network node 102, through a receiving port 707. In some examples, the receiving port 707 may be, for example, connected to one or more antennas in first network node 101. In other embodiments, the first network node 101 may receive information from another structure in the wireless communications network 100 through the receiving port 707. Since the receiving port 707 may be in communication with the processor 705, the receiving port 707 may then send the received information to the processor 705. The receiving port 707 may also be configured to receive other information.

The processor 705 in the first network node 101 may be further configured to transmit or send information to e.g., the second network node 102, through a sending port 708, which may be in communication with the processor 705, and the memory 706.

Those skilled in the art will also appreciate that the initiating sending module 701, the receiving module 702, the initiating module 703, and the other modules 704 described above may refer to a combination of analog and digital modules, and/or one or more processors configured with software and/or firmware, e.g., stored in memory, that, when executed by the one or more processors such as the processor 705, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 701-704 described above may be implemented as one or more applications running on one or more processors such as the processor 705.

Thus, the methods according to the embodiments described herein for the first network node 101 may be respectively implemented by means of a computer program 709 product, comprising instructions, i.e., software code portions, which, when executed on at least one processor 705, cause the at least one processor 705 to carry out the actions described herein, as performed by the first network node 101. The computer program 709 product may be stored on a computer-readable storage medium 710. The computer-readable storage medium 710, having stored thereon the computer program 709, may comprise instructions which, when executed on at least one processor 705, cause the at least one processor 705 to carry out the actions described herein, as performed by the first network node 101. In some embodiments, the computer-readable storage medium 710 may be a non-transitory computer-readable storage medium, such as a CD ROM disc, a memory stick, or stored in the cloud space. In other embodiments, the computer program 709 product may be stored on a carrier containing the computer program, wherein the carrier is one of an electronic signal, optical signal, radio signal, or the computer-readable storage medium 710, as described above.

The first network node 101 may comprise an interface unit to facilitate communications between the first network node 101 and other nodes or devices, e.g., the second network node 102. In some particular examples, the interface may, for example, include a transceiver configured to transmit and receive radio signals over an air interface in accordance with a suitable standard.

Figure 8:
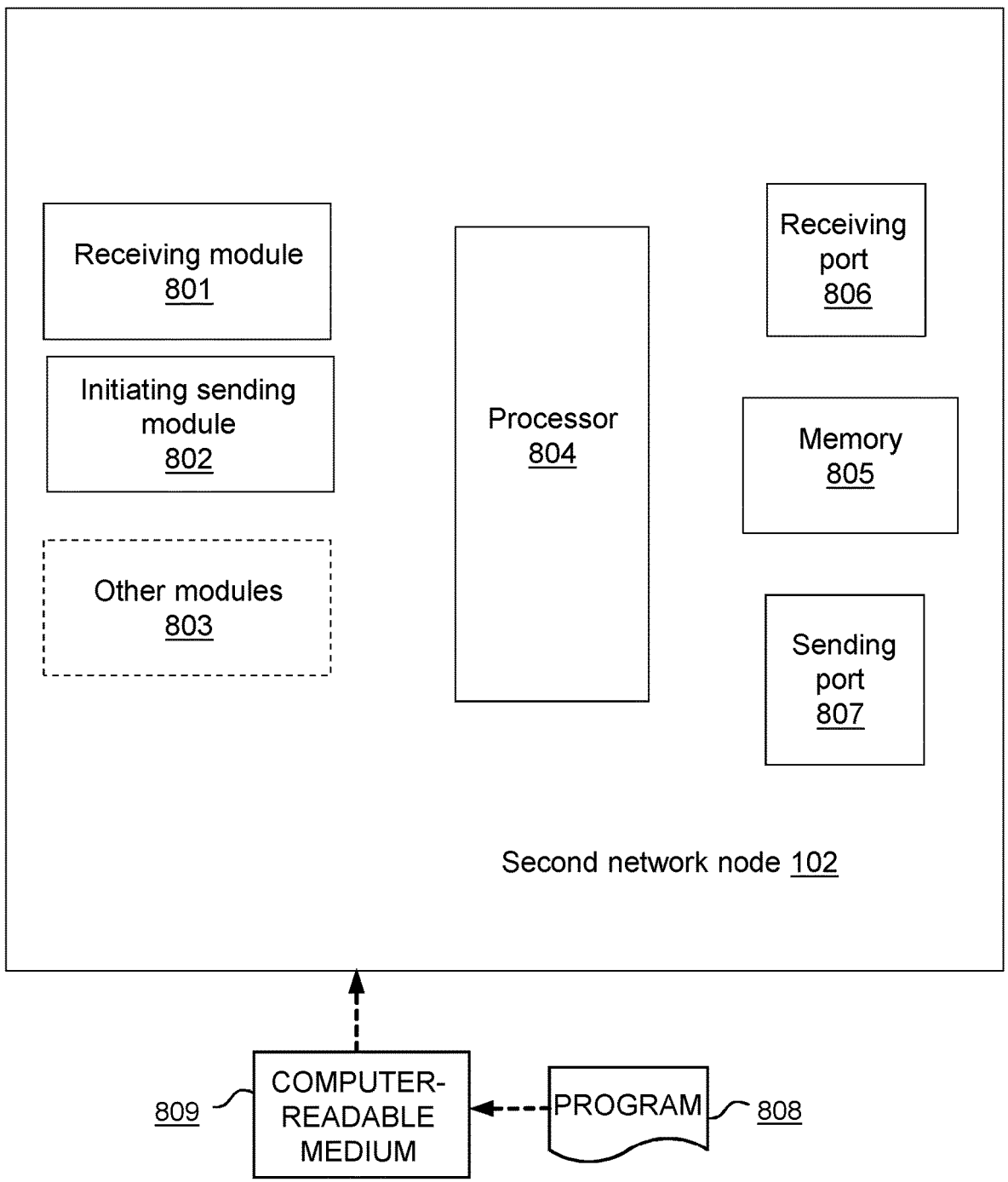
FIG. 8 is a schematic block diagram illustrating embodiments of a second network node, according to embodiments herein.

To perform the method actions described above in relation to FIG. 4, the second network node 102 may comprise the following arrangement depicted in FIG. 8. The second network node 102 is configured to operate in the wireless communications network 100.

The detailed description of some of the following corresponds to the same references provided above, in relation to the actions described for the second network node 102, and will thus not be repeated here. For example, the positioning procedure may be a multilateration procedure.

The second network node 102 is configured to, e.g. by means of a receiving module 801 within the second network node 102 configured to, receive the first paging request from the first network node 101 configured to operate in the wireless communications network 100. The first paging request is configured to indicate that the wireless device 141 configured to be served by the second network node 102 is to initiate cell reselection prior to sending the first response based on the first paging request. The first network node 101 and the wireless device 141 are further configured to operate in the wireless communications network 100. The receiving module 801 may be a processor 804 of the second network node 102, or an application running on such processor.

The second network node 102 is configured to have the first paging request trigger the second network node 102 to, e.g. by means of an initiating sending module 802 within the second network node 102 configured to, initiate sending the second paging request to at least the wireless device 141. The second paging request may be configured to be based on the first paging request. The second paging request may be further configured to indicate that the wireless device 141 is to initiate cell reselection prior to sending the first response. The first response may be configured to be the response to the second paging request. The initiating sending module 802 may be the processor 804 of the second network node 102, or an application running on such processor.

Particular examples of these embodiments have been provided in the description above.

In some embodiments, the first paging request may be configured to indicate to the second network node 102 that the wireless device 141 is to initiate cell reselection prior to sending the first response, using the value of the first information element configured to be comprised in the first paging request.

The second paging request may be further configured to indicate that the one or more wireless devices 140 comprising the wireless device 141 are to initiate cell reselection prior to sending the respective first response to the second paging request by one of: a) the value of the second information element configured to be comprised in the second paging request, the second information element being the skip indicator, b) the extension to the third information element configured to be comprised in the second paging request, and c) the fourth information element configured to be comprised in the second paging request, the fourth information element being the identity indicator configured to be dedicated to paging the one or more wireless devices 140 for positioning.

In some embodiments, any of: a) the value of the second information element, b) the extension to the third information element, and c) the fourth information element, may be further configured to indicate that the one or more wireless devices 140 are being paged for the positioning procedure.

The first paging request may be further configured to indicate that the wireless device 141 is to be paged for the positioning procedure.

The value of the first information element may be further configured to indicate to the second network node 102 that the second paging request is to further indicate that the wireless device 141 is being paged for the positioning procedure.

In some embodiments, the second network node 102 may be configured to, e.g. by means of the receiving module 801 within the second network node 102 configured to, receive the first response to the second paging request from the wireless device 141 via the serving cell of the wireless device 141, the serving cell being configured to have been determined based on the performance of the cell reselection configured to be initiated.

The second network node 102 may be configured to, e.g. by means of the initiating sending module 802 within the second network node 102 configured to, initiate sending, to the first network node 101, the second response based on the received first response.

In some embodiments, the received first paging request may be configured to be comprised in the PAGING-PS PDU.

In some embodiments, the first network node 101 may be an SGSN, the second network node 102 may be comprised in a BSS, the wireless device 141 may be a mobile station, and the wireless communications network 100 may be a GERAN network.

Other modules 803 may be comprised in the second network node 102.

The embodiments herein may be implemented through one or more processors, such as a processor 804 in the second network node 102 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the second network node 102. One such carrier may be in the form of a CD ROM disc. It is however feasible with other data carriers such as a memory stick. The computer program code may furthermore be provided as pure program code on a server and downloaded to the second network node 102.

The second network node 102 may further comprise a memory 805 comprising one or more memory units. The memory 805 is arranged to be used to store obtained information, store data, configurations, schedulings, and applications etc. to perform the methods herein when being executed in the second network node 102.

In some embodiments, the second network node 102 may receive information from, e.g., the first network node 101 or any of the one or more wireless devices 140, through a receiving port 806. In some examples, the receiving port 806 may be, for example, connected to one or more antennas in second network node 102. In other embodiments, the second network node 102 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the second network node 102 may be further configured to transmit or send information to e.g., the first network node 101 or any of the one or more wireless devices 140, through a sending port 807, which may be in communication with the processor 804, and the memory 805.

Those skilled in the art will also appreciate that the receiving module 801, the initiating sending module 802 and the other modules 803 described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 801-803 described above may be implemented as one or more applications running on one or more processors such as the processor 804.

Thus, the methods according to the embodiments described herein for the second network node 102 may be respectively implemented by means of a computer program 808 product, comprising instructions, i.e., software code portions, which, when executed on at least one processor 804, cause the at least one processor 804 to carry out the actions described herein, as performed by the second network node 102. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the second network node 102. In some embodiments, the computer-readable storage medium 809 may be a non-transitory computer-readable storage medium, such as a CD ROM disc, a memory stick, or stored in the cloud space. In other embodiments, the computer program 808 product may be stored on a carrier containing the computer program, wherein the carrier is one of an electronic signal, optical signal, radio signal, or the computer-readable storage medium 809, as described above.

The second network node 102 may comprise an interface unit to facilitate communications between the second network node 102 and other nodes or devices, e.g., the first network node 101 or any of the one or more wireless devices 140. In some particular examples, the interface may, for example, include a transceiver configured to transmit and receive radio signals over an air interface in accordance with a suitable standard.

Figure 9:
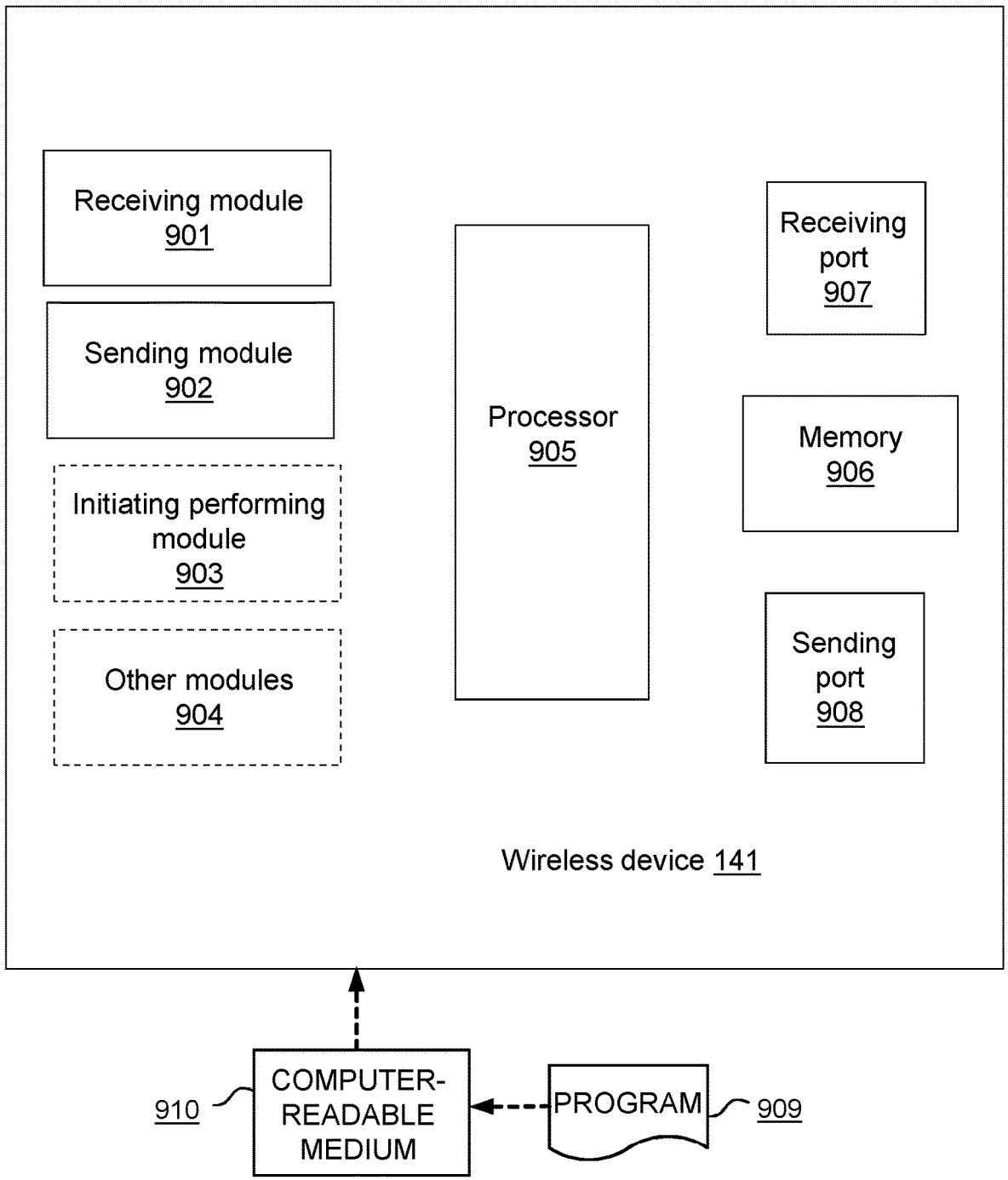
FIG. 9 is a schematic block diagram illustrating embodiments of a wireless device, according to embodiments herein.

To perform the method actions described above in relation to FIG. 6, the wireless device 141 may comprise the following arrangement depicted in FIG. 9. The wireless device 141 is configured to operate in the wireless communications network 100.

The detailed description of some of the following corresponds to the same references provided above, in relation to the actions described for the wireless device 141, and will thus not be repeated here. For example, the positioning procedure may be a multilateration procedure.

The wireless device 141 is configured to, e.g. by means of a receiving module 901 within the wireless device 141 configured to, receive, from the second network node 102 configured to be serving the wireless device 141, the second paging request. The second paging request is configured to be based on the first paging request from the first network node 101 being configured to be in communication with the second network node 102. The second paging request is further configured to indicate that the wireless device 141 is to initiate cell reselection prior to sending the first response to the second paging request. The first response is configured to be based on the first paging request. The receiving module 901 may be a processor 905 of the wireless device 141, or an application running on such processor.

The wireless device 141 is configured to, e.g. by means of a sending module 902 within the wireless device 141 configured to, send the first response to the first network node 101, after having initiated the cell reselection configured to be indicated by the second paging request. The sending module 902 may be the processor 905 of the wireless device 141, or an application running on such processor.

In some embodiments, the wireless device 141 may be configured to, e.g. by means of an initiating performing module 903 within the wireless device 141 configured to, initiate performing of cell reselection based on the second paging request configured to be received. The initiating performing module 903 may be the processor 905 of the wireless device 141, or an application running on such processor.

To send the first response, may be configured to be performed via the serving cell of the wireless device 141, the serving cell being configured to be determined based on the performance of the cell reselection configured to be initiated.

Particular examples of these embodiments have been provided in the description above.

In some embodiments, the second paging request may be further configured to indicate that one or more wireless devices 140 comprising the wireless device 141 are to initiate cell reselection prior to sending the respective first response to the second paging request by one of: a) the value of the second information element configured to be comprised in the second paging request, the second information element being the skip indicator, b) the extension to the third information element configured to be comprised in the second paging request, and c) the fourth information element configured to be comprised in the second paging request, the fourth information element being the identity indicator dedicated to paging the one or more wireless devices 140 for positioning.

Any of: a) the value of the second information element, b) the extension to the third information element, and c) the fourth information element, may be further configured to further indicate that the one or more wireless devices 140 are being paged for the positioning procedure.

In some embodiments, the second paging request may be further configured to indicate that the wireless device 141 is being paged for the positioning procedure.

In some embodiments, the first paging request may be configured to be comprised in the PAGING-PS PDU.

In some embodiments, the first network node 101 may be an SGSN, the second network node 102 may be comprised in a BSS, the wireless device 141 may be a mobile station, and the wireless communications network 100 may be a GERAN network.

Other modules 904 may be comprised in the wireless device 141.

The embodiments herein may be implemented through one or more processors, such as a processor 905 in the wireless device 141 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the wireless device 141. One such carrier may be in the form of a CD ROM disc. It is however feasible with other data carriers such as a memory stick. The computer program code may furthermore be provided as pure program code on a server and downloaded to the wireless device 141.

The wireless device 141 may further comprise a memory 906 comprising one or more memory units. The memory 906 is arranged to be used to store obtained information, store data, configurations, schedulings, and applications etc. to perform the methods herein when being executed in the wireless device 141.

In some embodiments, the wireless device 141 may receive information from, e.g., the first second network node 102, through a receiving port 907. In some examples, the receiving port 907 may be, for example, connected to one or more antennas in wireless device 141. In other embodiments, the wireless device 141 may receive information from another structure in the wireless communications network 100 through the receiving port 907. Since the receiving port 907 may be in communication with the processor 905, the receiving port 907 may then send the received information to the processor 905. The receiving port 907 may also be configured to receive other information.

The processor 905 in the wireless device 141 may be further configured to transmit or send information to e.g., the first second network node 102, through a sending port 908, which may be in communication with the processor 905, and the memory 906.

Those skilled in the art will also appreciate that the receiving module 901, the sending module 902, the initiating performing module 903, and the other modules 904 described above may refer to a combination of analog and digital modules, and/or one or more processors configured with software and/or firmware, e.g., stored in memory, that, when executed by the one or more processors such as the processor 905, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 901-904 described above may be implemented as one or more applications running on one or more processors such as the processor 905.

Thus, the methods according to the embodiments described herein for the wireless device 141 may be respectively implemented by means of a computer program 909 product, comprising instructions, i.e., software code portions, which, when executed on at least one processor 905, cause the at least one processor 905 to carry out the actions described herein, as performed by the wireless device 141. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the wireless device 141. In some embodiments, the computer-readable storage medium 910 may be a non-transitory computer-readable storage medium, such as a CD ROM disc, a memory stick, or stored in the cloud space. In other embodiments, the computer program 909 product may be stored on a carrier containing the computer program, wherein the carrier is one of an electronic signal, optical signal, radio signal, or the computer-readable storage medium 910, as described above.

The wireless device 141 may comprise an interface unit to facilitate communications between the wireless device 141 and other nodes or devices, e.g., second network node 102. In some particular examples, the interface may, for example, include a transceiver configured to transmit and receive radio signals over an air interface in accordance with a suitable standard.

When using the word "comprise" or "comprising", it shall be interpreted as non-limiting, i.e. meaning "consist at least of".

As used herein, the terms "number", "value" may be any kind of digit, such as binary number or the like. Moreover, "number", "value" may be one or more characters, such as a letter or a string of letters. "Number", "value" may also be represented by a bit string.

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method performed by a first network node, the first network node operating in a wireless communications network, the method comprising:

sending a first paging request to a second network node, the first paging request indicating that the second network node is to send a second paging request to a wireless device that instructs the wireless device to initiate cell reselection prior to the wireless device sending a first response to the second paging request; wherein the second network node and the wireless device are operating in the wireless communications network.

2. The method of claim 1, wherein the first paging request further indicates that the wireless device is to be paged for a positioning procedure.

3. The method of claim 1, wherein a value of a first information element comprised in the first paging request indicates to the second network node that the second paging request is to further indicate that the wireless device is being paged for a positioning procedure.

4. The method of claim 1, further comprising:
receiving a second response from the second network node, the second response being based on the first paging request and on the first response, wherein the second response indicates a serving cell of the wireless device, the indicated serving cell being based on the cell reselection, and further comprising
initiating the positioning procedure based on the indicated serving cell.

5. The method of claim 4, wherein the received second response further indicates that the second response is based on the first response from the wireless device responding to a second paging request indicating a positioning procedure.

6. The method of claim 1, wherein the first paging request sent by the first network node is comprised in a Paging Protocol Data Unit Specific Protocol Data Unit (PAGING-PS PDU).

7. A method performed by a second network node operating in a wireless communications network, the method comprising:
receiving a first paging request from a first network node operating in the wireless communications network, the first paging request indicating that a wireless device served by the second network node is to initiate cell reselection prior to the wireless device sending a first response to a second paging request sent by the second network node to the wireless device, based on the first paging request;
sending the second paging request to the wireless device, the second paging request being triggered by the first paging request, wherein the second paging request instructs the wireless device to initiate cell reselection prior to sending the first response.

8. The method of claim 7, wherein the first paging request indicates to the second network node that the wireless device is to initiate cell reselection prior to sending the first response, using a value of a first information element comprised in the first paging request.

9. The method of claim 7, wherein the first paging request further indicates that the wireless device is to be paged for a positioning procedure.

10. The method of claim 8, wherein the value of the first information element further indicates to the second network node that the second paging request is to further indicate that the wireless device is being paged for a positioning procedure.

11. The method of claim 7, further comprising:
receiving the first response to the second paging request from the wireless device via a serving cell of the wireless device, the serving cell having been determined based on the initiated performance of the cell reselection, and sending, to the first network node, a second response based on the received first response.

12. The method of claim 7, wherein the received first paging request is comprised in a Paging Protocol Data Unit Specific Protocol Data Unit (PAGING-PS PDU).

13. A method performed by a wireless device operating in a wireless communications network, the method comprising:
receiving, from a second network node serving the wireless device, a second paging request, the second paging request being triggered by a first paging request from a first network node in communication with the second network node, wherein the second paging request instructs the wireless device to initiate cell reselection prior to sending a first response to the second paging request; and
sending the first response to the first network node, after having initiated the cell reselection indicated by the second paging request.

14. The method of claim 13, further comprising:
initiating performing of cell reselection based on the received second paging request, and
wherein the sending of the first response, is performed via a serving cell of the wireless device, the serving cell being determined based on the initiated performance of the cell reselection.

15. The method of claim 13, wherein the second paging request indicates that the wireless device is being paged for a positioning procedure.

16. A first network node configured to operate in a wireless communications network, the first network node comprising:
processing circuitry, and
memory operatively coupled to the processing circuitry and comprising, stored therein, program instructions for execution by the processing circuitry, whereby the first network node is configured to:
send a first paging request to a second network node, the first paging request being configured to indicate that the second network node is to send a second paging request to a wireless device that instructs the wireless device to initiate cell reselection prior to the wireless device sending a first response to the second paging request wherein the second network node and the wireless device operate in the wireless communications network.

17. The first network node of claim 16, wherein the first paging request configured to be sent by the first network node is configured to be comprised in a Paging Protocol Data Unit Specific Protocol Data Unit (PAGING-PS PDU).

18. A second network node configured to operate in a wireless communications network, the second network node comprising:
processing circuitry; and
memory operatively coupled to the processing circuitry and comprising, stored therein, program instructions for execution by the processing circuitry, whereby the first network node is configured to:
receive a first paging request from a first network node configured to operate in the wireless communications network, the first paging request being configured to indicate that a wireless device served by the second network node is to initiate cell reselection prior to the wireless device sending a first response to a second paging request sent by the second network node to the wireless device;

send the second paging request to the wireless device, the second paging request being triggered by the first paging request, wherein the second paging request instructs the wireless device to initiate cell reselection prior to sending the first response.

19. The second network node of claim 18, wherein the first paging request is configured to indicate to the second network node that the wireless device is to initiate cell reselection prior to sending the first response, using a value of a first information element configured to be comprised in the first paging request.

20. The second network node of claim 18, wherein the second network node is configured to receive the first paging request in a Paging Protocol Data Unit Specific Protocol Data Unit (PAGING-PS PDU).

21. A wireless device configured to operate in a wireless communications network, the wireless device comprising: processing circuitry; and memory operatively coupled to the processing circuitry and comprising, stored therein, program instructions for execution by the processing circuitry, whereby the first network node is configured to:

receive, from a second network node serving the wireless device, a second paging request, the second paging request being triggered by a first paging request from a first network node in communication with the second network node, wherein the second paging request instructs the wireless device to initiate cell reselection prior to sending a first response to the second paging request; and send the first response to the first second network node, after having initiated the cell reselection configured to be indicated by the second paging request.

* * * * *